May 11, 1948.    M. D. TYLER    2,441,215
MOUNTING FOR GLASS SCALES
Filed Sept. 28, 1945
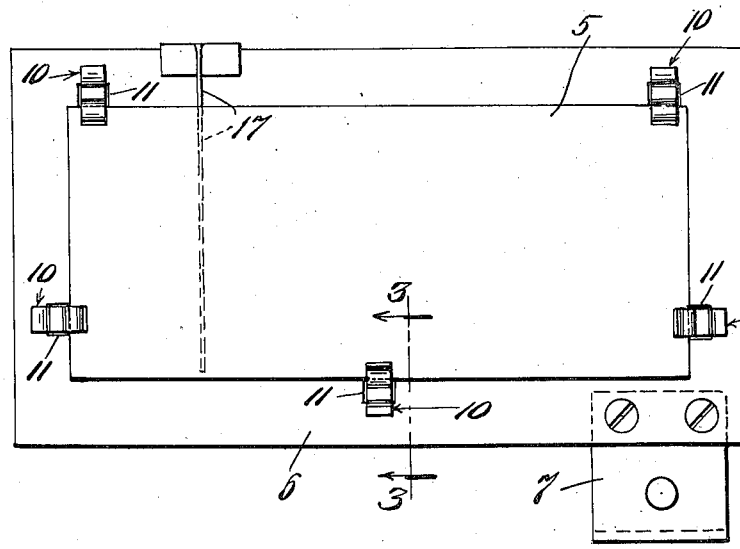
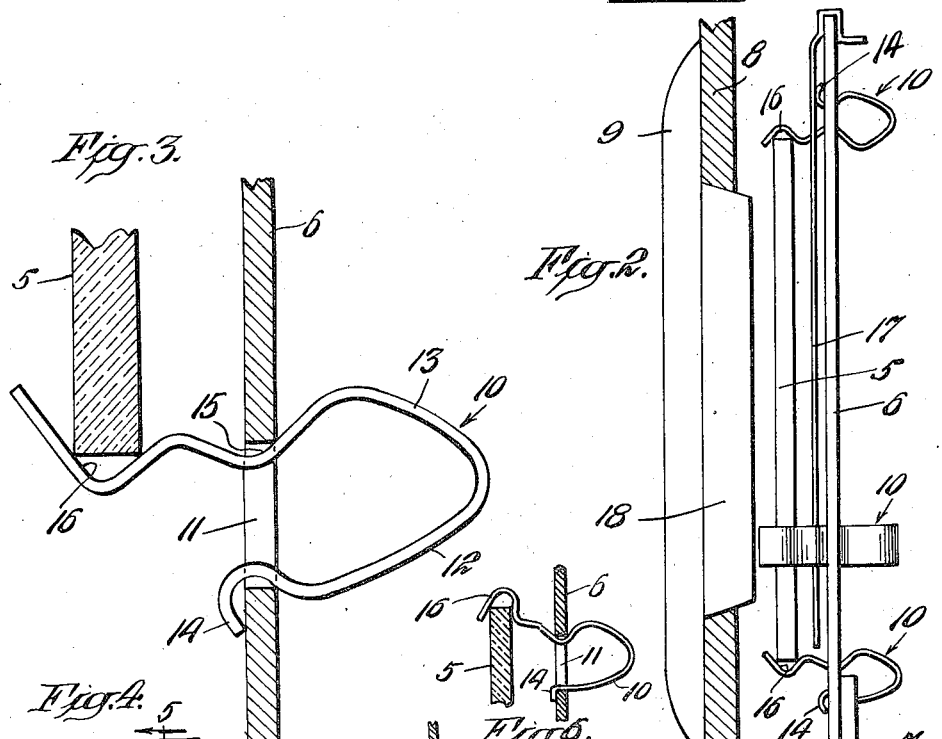
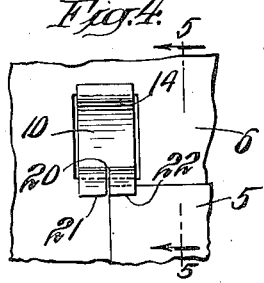
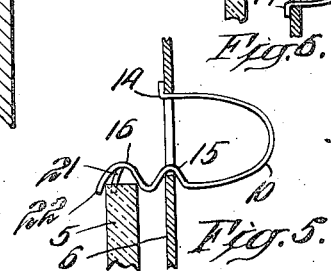
INVENTOR
MERLE D. TYLER
BY Philip J. O'Bean
ATTORNEY Patented May 11, 1948

2,441,215

UNITED STATES PATENT OFFICE 2,441,215

MOUNTING FOR GLASS SCALES

Merle D. Tyler, Villa Park, Ill., assignor to Croname, Incorporated, Chicago, Ill., a corporation of Illinois Application September 28, 1945, Serial No. 619,226

3 Claims. (Cl. 248—201)

The invention here disclosed relates to the mounting of glass scales, such as used in radio receiving sets.

These scales, to properly serve their purpose, must be accurately positioned. The problem has been to mount the glass in the required position but without strain and so that distortions and shocks will not break or crack the same.

Objects of this invention have been to provide a mounting which would hold the glass accurately in position without imposing any strains on the same and which would be of simple and inexpensive construction, easily assembled and otherwise practical and generally desirable.

Other objects and the novel features by which the purposes of the invention are attained are set forth or will appear in the course of the following specification.

The drawing accompanying and forming part of the specification illustrates a present practical embodiment of the invention. Structure, however, may be modified and changed as regards this present illustration, all within the true intent and broad scope of the invention as hereinafter defined and claimed.

Fig. 1 in the drawing is a front elevation of a radio scale incorporating features of the invention;

Fig. 2 is an enlarged end elevation of the same in relation to the enclosing cabinet;

Fig. 3 is a further enlarged broken sectional detail on substantially the plane of line 3—3 of Fig. 1;

Figs. 4 and 5 are broken and sectional details of a modification; and

Fig. 6 is a broken sectional detail of another modification.

In Figs. 1 and 2, the glass scale or so-called "crystal" of a radio receiver is indicated at 5, supported in spaced relation in front of the supporting plate or frame 6. The latter is usually mounted by means of some kind of a bracket 7 on the chassis of the receiver so that the scale will occupy a predetermined relation to the chassis and hence to the escutcheon of the cabinet when the chassis is mounted in its proper relation in the cabinet.

In Fig. 2 the front wall of a cabinet structure is indicated at 8, with an escutcheon 9 set therein, the glass scale appearing in back of this escutcheon.

The glass is flexibly supported in self-centering relation by a series of spring clips of U formation, in the nature of hairpin springs, designated 10. These are shown as made up of flat strip stock and as fitting in rectangular holes 11 in the supporting plate 6 and thus held against twisting or turning.

These clips, further, are of special design in that they are doubled in wedge-like formation providing relatively inclined sides 12, 13, adapted to be readily pushed through the openings 11, and with one side having a hooked terminal 14 to engage over one edge of the opening and the other side 13 longer and having one indentation 15 to hook over the opposite edge and a second indentation 16 toward the end and adapted to form a seat for the edge of the glass.

In use the clips are just pushed through the openings 11, and they may be pushed through from either side, and then the glass is seated in the notches or indentations 16 in the free ends of the clips, these ends being free enough to be sprung sufficiently to engage the edge of the glass.

The number and disposition of the clips may vary according to the size and shape of the glass. For an ordinary size scale the clips may be positioned as indicated in Fig. 1, two at the top near the ends, two at the ends and one at the bottom near the center. This arrangement centers and holds a rectangular panel such as illustrated, allowing for small imperfections in the glass and holding it yieldingly though firmly, accurately positioned in respect to the rest of the mechanism.

As shown particularly in Fig. 2, the longer spring extensions of the clips support the scale spaced in front of the frame or mounting plate 6 with room for the pointer or indicating element 17 to operate in between the frame and the glass and with clear space substantially all about the glass for favorable edge lighting or other illuminating effects. These clips may be spaced back or away from the edges of the escutcheon opening so as not to be visible, and the escutcheon may be made with an inwardly extending flange such as indicated at 18, to further assist in concealing the mounting clips.

Fig. 3 shows how the relatively inclined sides of the seats or indentations 16 grip the edges of the glass to avoid any looseness, and this view also shows how the hooked ends 14 may fulcrum over the edges of the mounting openings to accommodate themselves to the size and fit of the glass. In this view, too, it will be clear that the inclined sides of the notches or seats 15 in such self-adjustment of the spring clips will in all cases firmly engage the edges of the openings to avoid any looseness of the clips in the mounting frame or plate. These clips can be automatically produced from flat strip spring stock at low cost, and the rectangular shape of the openings enables the clips to grip and hold themselves against turning or twisting in the openings.

Figs. 4 and 5 show how by slight modification the clips may be adapted to hold the corners of the dial. In these views the indented end portion 16 for setting and holding the edge of the dial is split, as indicated at 20, providing separate tongues 21, 22, and one of these tongues, 21, in the illustration, is bent inward, as in Fig. 5, to engage over the end of the dial while the other tongue 22 is left in its original form to engage over the top of the glass.

Fig. 4 shows the upper left hand corner of the glass. At the upper right hand corner a clip will be used having the tongue 22 bent down to engage the end of the glass and the tongue 21 left in its original state to engage over the upper edge of the glass. In this way the glass may be located endwise by just two upper, corner holding clips, and a single clip be used at the bottom positioned to engage the mid-length portion of the lower edge. Thus only three clips may suffice in place of five clips such as shown in Fig. 1.

Fig. 6 illustrates a second modification in which the long arm of the clip carrying the seat for the glass is disposed at the far side of the clip receiving opening 11 so that pressure of the glass against the free end of the clip tends to expand the clip and hold it more securely in the seating opening in the supporting frame. This construction allows for a larger size glass on a given size frame.

While generally preferred to make the clips of flat strip material, it is contemplated that they may be made of round wire, doubled to provide the same laterally extended holding effect for engagement in the rectangular openings 11 and for gripping engagement with the edges of the glass.

The new method of mounting here disclosed provides a maximum of open space about the edges of the glass for edge illumination and other features. The cushioning effect provided by the clips is present in both the direction in the plane of or parallel with the glass as well as at right angles to such a plane. The holding portion of the clip can move back and forth or in and out with respect to the frame and also up and down, providing the effect of universal self-adjustment and cushioning.

In all forms of the invention disclosed a certain amount of fulcrum adjustment is provided and allowed for, Figs. 5 and 6 illustrating two of the different ways in which this may be accomplished.

While usually of glass and for that reason ordinarily referred to by that name, it will be understood that the invention is applicable to dials and scales generally, whether made of glass, plastic or other materials, and the claims are to be construed accordingly.

What is claimed is:

1. An instrument scale, a support therefor, and reversely bent spring clips having doubled side portions yieldingly engaged with the support and single side portions projecting from the support and yieldingly engaged with the scale, said scale having angular corners and said clips being constructed of flat strip material and said projecting side portions of the same having split ends disposed to engage over angularly related corner edges of the scale.

2. Means for accurately mounting a glass scale for a radio receiving set in yieldingly held cushioned relation comprising a supporting plate having openings therethrough disposed in the approximate outline of the scale to be mounted, substantially U-shaped spring clips extending through said openings and having indentations in the opposite sides of the same engaged over opposite edge portions of the openings to yieldingly position and retain the clips in said openings, said clips having free extending arm portions projecting away from the face of the support and provided with indentations spaced all approximately the same substantially equal distance away from the face of the support and collectively disposed in an outline generally corresponding to but of less external dimensions than the outline of the scale to be mounted and a glass scale of slightly greater outline dimensions than the outline formed by said indentations in the free projecting arms of the clips, said scale having its edge seated in said spring arm indentations and thereby spreading said spring arms sufficiently to effect firm yielding grip of the scale and the support of the latter in accurately placed location spaced substantially parallel away from the face of the supporting plate.

3. Means for accurately mounting a glass scale for a radio receiving set in yieldingly held cushioned relation comprising a supporting plate having openings therethrough disposed in the approximate outline of the scale to be mounted, substantially U-shaped spring clips extending through said openings and having indentations in the opposite sides of the same engaged over opposite edge portions of the openings to yieldingly position and retain the clips in said openings, said clips having free extending arm portions projecting away from the face of the support and provided with indentations spaced all approximately the same substantially equal distance away from the face of the support and collectively disposed in an outline generally corresponding to but of less external dimensions than the outline of the scale to be mounted and a glass scale of slightly greater outline dimensions than the outline formed by said indentations in the free projecting arms of the clips, said scale having its edge seated in said spring arm indentations and thereby spreading said spring arms sufficiently to effect firm yielding grip of the scale and the support of the latter in accurately placed location spaced substantially parallel away from the face of the supporting plate, said openings in the supporting plate having opposite edges substantially parallel to the edges of the glass scale and the clips being formed of flat strip material and disposed with the flat extent of the same in flat bearing engagement with said opposite substantially parallel edges of the openings and thereby held against turning in the openings and with flat extending portions of the spring arms in flat engagement with the edges of the scale.

MERLE D. TYLER.

REFERENCES CITED

The following references are of record in the file of this patent:

UNITED STATES PATENTS

| Number | Name | Date |
|---|---|---|
| 1,496,388 | Stern | June 3, 1924 |
| 1,929,590 | Krentler | Oct. 10, 1933 |
| 2,108,347 | Quarnstrom | Feb. 15, 1938 |
| 2,122,328 | Schnell | June 28, 1938 |
| 2,279,165 | Grace | Apr. 7, 1942 |